UNITED STATES PATENT OFFICE.

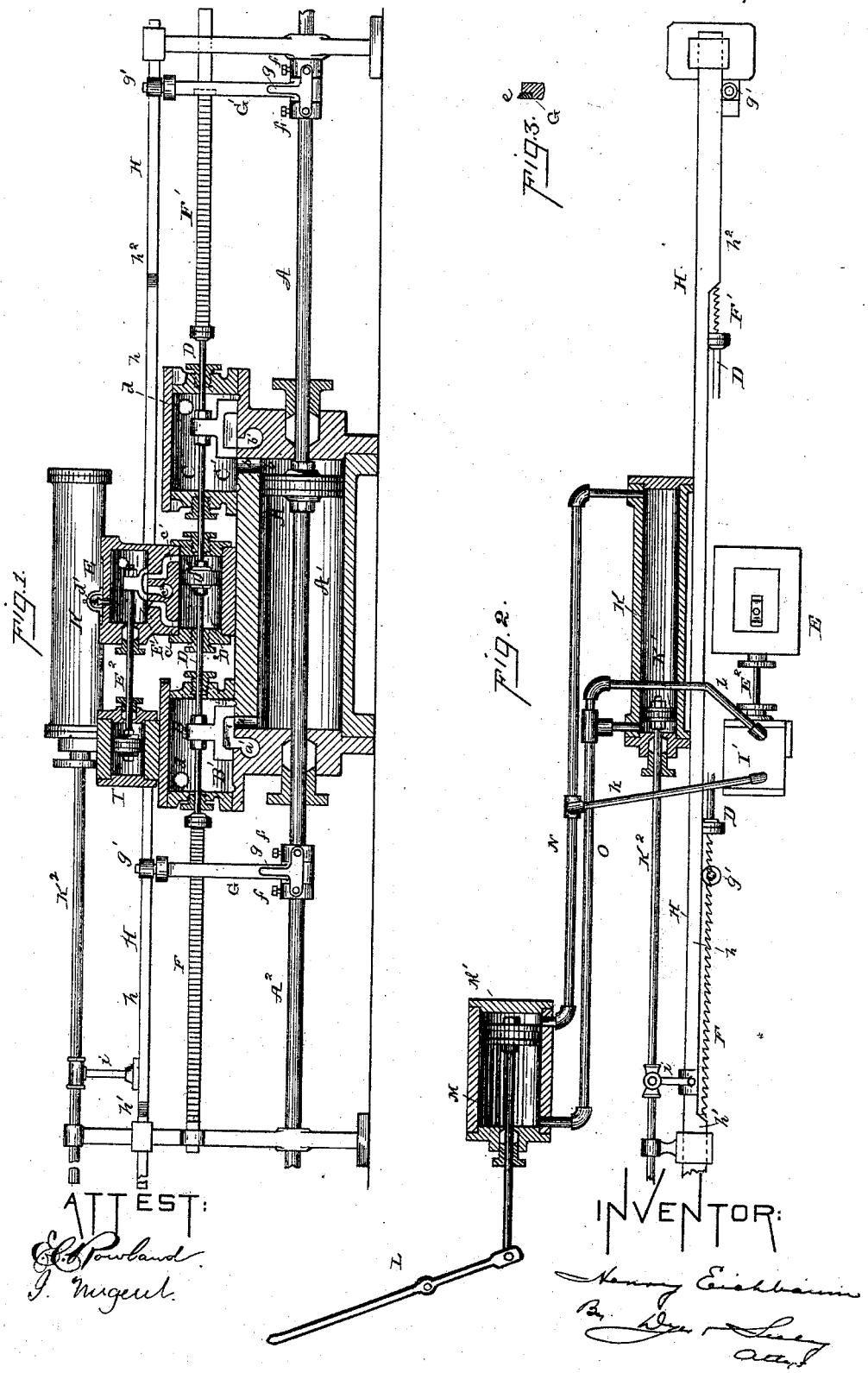

HENRY EICHBAUM, OF MOUNT VERNON, NEW YORK, ASSIGNOR OF ONE-HALF TO GEORGE MAITLAND, OF DETROIT, MICHIGAN.

VALVE-CONTROLLING MECHANISM FOR MOTORS.

SPECIFICATION forming part of Letters Patent No. 498,970, dated June 6, 1893.

Application filed August 5, 1887. Serial No. 246,176. (No model.)

*To all whom it may concern:*

Be it known that I, HENRY EICHBAUM, of Mount Vernon, in the county of Westchester and State of New York, have invented a certain new and useful Improvement in Valve-Controlling Mechanisms for Motors, of which the following is a specification.

The invention relates to a class of motors, whether water, steam or other fluid under pressure is employed to drive them, which are used for moving valves as in hydraulic or steam elevators, or as the operative element of power steering apparatus and similar mechanisms, in connection with which motors controlling valves are employed which are closed by the movement of the motor and so that the movement of the motor will correspond in direction and be proportional in extent to the movement of the hand operated lever or wheel, the object being to move quickly and with certainty by a short hand movement, and in a direction and to an extent corresponding with the hand movement, mechanism which is too heavy or requires too great an extent of movement to be readily worked directly by hand.

The invention consists in various combinations of the devices employed by me to accomplish this end as fully hereinafter explained and pointed out by the claims.

In the accompanying drawings, forming a part hereof,—Figure 1, is a vertical section and partial elevation of the apparatus; Fig. 2, a top view and partial horizontal section of parts of the apparatus; and Fig. 3, a cross section of one of the rocking arms carried by the main or operating rod.

A is the piston of the main or operating motor, moving in a cylinder A'. Its rod $A^2$ extends through both heads of the cylinder and is the main working part or operating rod of the mechanism. To this operating rod is connected the valve, clutch or other apparatus, which this mechanism is designed to operate and control. Upon the ends of the cylinder A' are mounted two valve chests B, C, inclosing slide valves B', C', which act to connect the ports $a$ $b$ at the ends of the cylinder A' alternately with the valve-chests B, C, and with the exhaust ports $a'$ $b'$. The valves B' C' are connected with a common valve-rod D, upon which is also a controlling piston D' of an auxiliary motor moving in a cylinder $D^2$ and acting to operate the valves through the common valve rod. The valves B' C' act together and obviously perform functions which may be performed by one valve and properly connected ports.

Upon the cylinder $D^2$ is a valve chest E including a slide valve E' which acts to control the ports $c$ $c'$ at the ends of the cylinder $D^2$ and the exhaust port $c^2$ at the center of the valve chest E. The valve chests B C and E have inlets $d$ connected with the pressure supply, which in the case of a hydraulic elevator is the water pressure that operates the elevator, while the valve chest E has a pressure relief valve $d'$ which opens when the water pressure in the chest E rises above the normal.

The controlling rod D, which carries the valves B' C' and piston D', extends beyond the valve chests B C and carries on its ends two rack bars F F' having teeth raking toward the outer ends of the bars.

Upon the main operating piston rod $A^2$, beyond the ends of the cylinder A', are mounted two rocking arms G G', having each one or more teeth $e$ engaging with the teeth of the racks when moving inwardly toward the cylinder A' but sliding over such teeth in moving outwardly away from said cylinder A'. The arms G G' are mounted on the rod $A^2$ between fixed collars $f$, so that the arms are free to rock on such rod. Springs $g$ are secured to the collars $f$ and press the arms G G' upon the rack bars F F'. Parallel with the rack bars F F' and located above such rack bars is a sliding bar H, upon which ride rollers $g'$ on the ends of the arms G G'. The center section $h$ of the bar H is cut away leaving the end sections $h'$ $h^2$ projecting beyond the center section, but connected with it by inclined surfaces as shown. The relation of the sections $h$, $h'$ and $h^2$ of the sliding bar H is such that when the rollers $g'$ of either of the arms G G' is riding on an end section of the bar H the tooth $e$ of the arm will be held out of engagement with the teeth of the rack bar, but when the roller reaches the depressed center section $h$ of the bar H the arm will be rocked on the rod A² by its spring g and the tooth e of the arm will engage the teeth of the rack bar.

Now if the parts are in the position shown in Fig. 1, the cylinder A' will receive pressure at its right hand end and be connected with the exhaust at the other end, and the piston A will be moved toward the left. In this movement, the tooth on the arm G will slide back over the teeth of the rack F, while the arm G' will be held out of engagement with the rack F' so long as its roller g' rides on the end section h² of the bar H. But when the movement of the piston A has proceeded far enough to bring the roller g' of the arm G' to the depressed center section h of the bar H, then the tooth e of the bar G' will engage the rack bar F' and lock that rack bar and the valve rod D of which it is a part to the main operating rod A², and any farther movement of the piston A must also move the valves B' C'. The piston A' continues its movement far enough to cause the valves B' C' to cover the ports a b at the ends of the cylinder A', when the pressure on both sides of the piston A will become the same and the piston will come to rest. The relief valve d' permits an easy backward movement of the piston D'. Hence, it will be seen, the extent of movement of the main piston in either direction will depend upon the position of the bar H. To control the position of that bar and to work the valve E' I prefer to employ an arrangement of hydraulic apparatus.

The rod E² of the valve E' is connected with a piston I inclosed by a small cylinder I'.

K is a cylinder in which works a piston K' having a length of movement as great as it is desired to give the bar H. The rod K² of this piston is connected by the arm i with the bar H.

The hand-operated controlling lever L works a piston M in a cylinder M' which has a capacity equal to or greater than the cylinder K. Pipes N O extend from the opposite ends of the cylinder M' to the opposite ends of the cylinder K and by branches k l to the opposite ends of the cylinder I', the connection being such that the movement of the piston K' is opposite to that of the piston I. The cylinders I', K and M' and the pipes N, O and k and l are filled with a liquid, which may be water, but is preferably glycerine.

When the hand-lever L is moved in either direction from any position of rest, the small piston I and the valve E' will be shifted the full length of their stroke which is a short one, unless they have already been shifted by a preceding movement in the same direction; the piston K' at the same time will be moved a distance proportional to the travel of the hand-piston M and the controlling bar H will be correspondingly moved. The movement of the main or operating piston and rod, which then takes place through the opening of the valves, is arrested at the point determined by the position of the bar H. In this way it will be seen that the movements of the main or operating piston will correspond with and be proportional to the movement of the hand-lever with the exception of the small additional movement necessary to shift the valves B' C'.

It is evident that the movement of the bar H and the valve E' could be accomplished in a more direct manner from the hand-lever but I prefer the intermediate hydraulic mechanism for this purpose, especially when the operation is controlled from a distant point as on a moving elevator car.

What I claim is—

1. The combination of a fluid motor, its controlling valves, a hand lever, motion transmitting connections from said lever to said controlling valves, a connecting device moved by the motor and adapted to temporarily engage the valves, at a variable point in the operation of the motor, so as to close said valves, and connections from said hand lever to said connecting device whereby the movement of the lever adjusts the point at which the valves are engaged and moved by the motor, substantially as set forth.

2. The combination of a fluid motor, its controlling valves, a connecting device moved by the motor and adapted to temporarily engage the valves, at a variable point in the operation of the motor, so as to close said valves, a shifting guide bar engaging the said connecting device and determining the point at which the valves are engaged and moved by the motor, a hand lever, and connections from said lever to said guide bar for moving the latter, substantially as set forth.

3. The combination of a fluid motor, its controlling valves, rack bars on the valve rod, pawl arms on the motor piston rod, and a shifting guide bar with depressed and raised guiding surfaces which engage said pawl arms for controlling the point at which the pawl arms of the motor will engage the racks of the valve rod, substantially as set forth.

4. The combination of a fluid motor, its controlling valves, an auxiliary motor connected with said valves for moving the same, a connecting device moved by the motor and adapted to temporarily engage the valves, at a variable point in the operation of the motor, so as to close said valves, a hand lever, connections from said lever to the auxiliary motor for controlling the same, and connections from said lever to said connecting device, substantially as set forth.

5. The combination of a fluid motor, its controlling valves, an auxiliary motor connected with said valves for moving the same, a cylinder having a piston connected with the valve of the auxiliary motor, a hand lever, hydraulic connections between said hand lever and said cylinder and piston, a connecting device moved by the motor and adapted to temporarily engage the valves, at a variable point in the operation of the motor, so as to close said valves, and connections between said hand lever and said connecting device, whereby the movement of the lever adjusts the point at which the valves are engaged and moved by the motor, substantially as set forth.

6. The combination of a fluid motor, its controlling valves, a connecting device moved by the motor and adapted to temporarily engage the valves, at a variable point in the operation of the motor, so as to close said valves, a shifting device engaging the said connecting device so as to adjust the point at which the valves are engaged, and a hydraulic piston for moving said shifting device, substantially as set forth.

7. The combination of a fluid motor, its controlling valves, a connecting device moved by the motor and adapted to temporarily engage the valves, at a variable point in the operation of the motor, so as to close said valves, a shifting device engaging said connecting device to adjust the point at which the valves are engaged, a piston connected with said shifting device, a cylinder inclosing said piston, a hand operated lever working another piston in a cylinder, and pipes filled with liquid connecting the two cylinders, substantially as set forth.

8. The combination of a fluid motor, its controlling valves, a connecting device moved by the motor and adapted to temporarily engage the valves, at a variable point in the operation of the motor, so as to close said valves, a hydraulic piston having a short stroke and connected with said controlling valves for moving the same, a hydraulic piston having a long stroke and connected with the said connecting device for adjusting the point at which the valves are engaged thereby, and a hand lever controlling the pressure upon both pistons, substantially as set forth.

9. The pistons K' and I operated by hydraulic pressure controlled by the hand lever L, the movement of the piston K' corresponding in direction and extent with that of the hand lever, while the piston I is given its full stroke by the minimum movement of the hand lever, in combination with a fluid motor, a controlling valve for the motor connected with the piston I so as to be moved thereby, a connecting device moved by the motor and adapted to temporarily engage the valves which control the motor at a variable point in its operation, so as to close said valves at that point, a shifting device engaging said connecting device to adjust the point at which the valves are engaged thereby, and connections from the piston K' to said shifting device, substantially as set forth.

10. The combination of a fluid motor, its controlling valves, an auxiliary motor connected with said valves for moving them, a connecting device moved by the motor and adapted to temporarily engage the valves, at a variable point in the operation of the motor, so as to close said valves, a hand operated lever connected with the auxiliary motor and controlling the operation thereof, connections between said hand lever and said connecting device, whereby the movement of the lever adjusts the point at which the valves are engaged, and a relief valve permitting the auxiliary motor to be moved by the main motor against its operating pressure, substantially as set forth.

This specification signed and witnessed this 4th day of August, 1887.

HENRY EICHBAUM.

Witnesses:
H. W. SEELY,
E. C. ROWLAND.